(12) United States Patent
Lathuilière et al.

(10) Patent No.: US 8,929,621 B2
(45) Date of Patent: Jan. 6, 2015

(54) METHODS AND SYSTEMS FOR SEGMENTATION AND SURFACE MATCHING

(75) Inventors: Fabienne Lathuilière, Montreal (CA); Véronique Audet, Montreal (CA); Tony Falco, La Prairie (CA); Martin Lachaine, Montreal (CA)

(73) Assignee: Elekta, Ltd., Montreal (CA)

( * ) Notice: Subject to any disclaimer, the term of this patent is extended or adjusted under 35 U.S.C. 154(b) by 1357 days.

(21) Appl. No.: 11/313,236

(22) Filed: Dec. 20, 2005

(65) Prior Publication Data

US 2007/0167699 A1 Jul. 19, 2007

(51) Int. Cl.
  *G06K 9/00* (2006.01)
  *G06K 9/32* (2006.01)
  *G06T 7/00* (2006.01)

(52) U.S. Cl.
  CPC ..... *G06T 7/0083* (2013.01); *G06T 2207/20116* (2013.01); *G06T 2200/04* (2013.01); *G06T 2207/30096* (2013.01); *G06T 2207/20104* (2013.01); *G06T 7/0089* (2013.01); *G06T 2207/10081* (2013.01)
  USPC .......................................... 382/128; 382/294

(58) Field of Classification Search
  USPC .......... 382/128–134, 164, 171, 173; 600/443, 600/516, 587, 337, 344, 138, 139, 159, 190, 600/197, 209
  See application file for complete search history.

(56) References Cited

U.S. PATENT DOCUMENTS

| | | | |
|---|---|---|---|
| 3,082,322 A | 3/1963 | Koerner et al. | 250/61.5 |
| 3,777,124 A | 12/1973 | Pavkovich | 235/151 |
| 3,987,281 A | 10/1976 | Hodes | 235/151.3 |
| 3,991,310 A | 11/1976 | Morrison | 250/312 |
| 4,118,631 A | 10/1978 | Froggatt | 378/65 |
| 4,618,978 A | 10/1986 | Cosman | 378/164 |
| 4,923,459 A | 5/1990 | Nambu | 606/130 |
| 4,943,990 A | 7/1990 | Schär | 378/152 |
| 5,039,867 A | 8/1991 | Nishihara et al. | 250/492.3 |
| 5,080,100 A | 1/1992 | Trotel | 128/653.1 |
| 5,099,846 A | 3/1992 | Hardy | 128/653.1 |
| 5,107,839 A | 4/1992 | Houdek et al. | 128/653.1 |
| 5,117,829 A | 6/1992 | Miller et al. | 128/653.1 |

(Continued)

FOREIGN PATENT DOCUMENTS

| EP | 0 647 457 | 4/1995 |
|---|---|---|
| EP | 1 304 960 | 6/2005 |

(Continued)

OTHER PUBLICATIONS

Cuadra, M.B.; Polio, C.; Bardera, A.; Cuisenaire, O.; Villemure, J.-G.; Thiran, J.-P., "Atlas-based segmentation of pathological MR brain images using a model of lesion growth," Medical Imaging, IEEE Transactions on, vol .23, No. 10, pp. 1301-1314, Oct. 2004.*

(Continued)

*Primary Examiner* — Andrae S Allison
(74) *Attorney, Agent, or Firm* — Finnegan, Henderson, Farabow, Garrett & Dunner LLP

(57) ABSTRACT

A contoured surface map of a lesion within a patient is obtained by shifting a reference surface to an estimated location in operational images. The process can be repeated to minimize errors, and the contoured surface map can then be segmented.

33 Claims, 9 Drawing Sheets

(56) References Cited

U.S. PATENT DOCUMENTS

| | | | |
|---|---|---|---|
| 5,207,223 A | 5/1993 | Adler | 128/653.1 |
| 5,222,499 A | 6/1993 | Allen et al. | 128/653.1 |
| 5,291,889 A | 3/1994 | Kenet et al. | 128/653.1 |
| 5,295,483 A | 3/1994 | Nowacki et al. | 128/660.03 |
| 5,301,674 A | 4/1994 | Erikson et al. | 128/661.01 |
| 5,379,642 A | 1/1995 | Reckwerdt et al. | 73/625 |
| 5,391,139 A | 2/1995 | Edmundson | 600/7 |
| 5,411,026 A | 5/1995 | Carol | 128/660.03 |
| 5,442,675 A | 8/1995 | Swerdloff et al. | 378/65 |
| 5,447,154 A | 9/1995 | Cinquin et al. | 128/653.1 |
| 5,511,549 A | 4/1996 | Legg et al. | 128/653.1 |
| 5,531,227 A | 7/1996 | Schneider | 128/653.1 |
| 5,531,520 A * | 7/1996 | Grimson et al. | 382/131 |
| 5,609,485 A | 3/1997 | Bergman et al. | 434/262 |
| 5,673,300 A | 9/1997 | Reckwerdt et al. | 378/65 |
| 5,690,108 A | 11/1997 | Chakeres | 128/653.1 |
| 5,715,166 A | 2/1998 | Besl et al. | 364/4.24 |
| 5,754,623 A | 5/1998 | Seki | 378/65 |
| 5,810,007 A | 9/1998 | Holupka et al. | 600/439 |
| 5,991,703 A | 11/1999 | Kase | 702/167 |
| 6,019,724 A | 2/2000 | Gronningsaeter et al. | 600/439 |
| 6,117,081 A | 9/2000 | Jago et al. | 600/443 |
| 6,122,341 A | 9/2000 | Butler et al. | 378/20 |
| 6,129,670 A | 10/2000 | Burdette et al. | 600/427 |
| 6,285,805 B1 | 9/2001 | Gueziec | 382/299 |
| 6,292,578 B1 | 9/2001 | Kalvin | 382/131 |
| 6,345,114 B1 | 2/2002 | Mackie et al. | 382/132 |
| 6,359,959 B1 | 3/2002 | Butler et al. | 378/20 |
| 6,385,286 B1 | 5/2002 | Fitchard et al. | 378/65 |
| 6,390,982 B1 | 5/2002 | Bova et al. | 600/443 |
| 6,438,202 B1 | 8/2002 | Olivera et al. | 378/65 |
| 6,516,046 B1 | 2/2003 | Frohlich et al. | 378/65 |
| 6,535,574 B1 | 3/2003 | Collins et al. | 378/65 |
| 6,546,073 B1 | 4/2003 | Lee | 378/65 |
| 6,553,152 B1 | 4/2003 | Miller et al. | 382/294 |
| 6,560,311 B1 | 5/2003 | Shepard et al. | 378/65 |
| 6,591,127 B1 | 7/2003 | McKinnon | 600/411 |
| 6,628,983 B1 | 9/2003 | Gagnon | 600/431 |
| 6,636,622 B2 | 10/2003 | Mackie et al. | 382/132 |
| 6,661,870 B2 | 12/2003 | Kapatoes et al. | 378/65 |
| 6,683,985 B1 | 1/2004 | Kase et al. | 382/203 |
| 6,754,374 B1 * | 6/2004 | Miller et al. | 382/128 |
| 6,909,794 B2 | 6/2005 | Caspi | |
| 7,333,644 B2 * | 2/2008 | Jerebko et al. | 382/128 |
| 7,343,030 B2 * | 3/2008 | Sawyer | 382/128 |
| 7,430,321 B2 * | 9/2008 | Okada et al. | 382/173 |
| 2001/0035871 A1 | 11/2001 | Bieger et al. | 345/630 |
| 2002/0018588 A1 | 2/2002 | Kusch | 382/131 |
| 2002/0082494 A1 | 6/2002 | Balloni et al. | 600/410 |
| 2002/0156375 A1 | 10/2002 | Kessman et al. | 600/439 |
| 2002/0176541 A1 | 11/2002 | Schubert et al. | 378/205 |
| 2002/0183610 A1 | 12/2002 | Foley et al. | 600/407 |
| 2002/0188194 A1 | 12/2002 | Cosman | 600/426 |
| 2003/0018232 A1 | 1/2003 | Elliott et al. | 600/1 |
| 2003/0112922 A1 | 6/2003 | Burdette et al. | 378/65 |
| 2003/0231790 A1 * | 12/2003 | Bottema | 382/128 |
| 2005/0148859 A1 * | 7/2005 | Miga et al. | 600/410 |
| 2005/0232474 A1 | 10/2005 | Wei | |
| 2006/0120608 A1 * | 6/2006 | Luo et al. | 382/224 |
| 2008/0292194 A1 * | 11/2008 | Schmidt et al. | 382/217 |

FOREIGN PATENT DOCUMENTS

| | | | |
|---|---|---|---|
| WO | 99/06644 | 4/1992 | A61N 5/10 |
| WO | 99/26534 | 6/1999 | A61B 5/05 |
| WO | 99/27839 | 6/1999 | |
| WO | 03/076003 A2 | 9/2003 | |
| WO | 03/076003 A3 | 9/2003 | A61N 1/00 |

OTHER PUBLICATIONS

Besl et al., *A Method for Registration of 3d Shapes*, IEEE Transactions on Pattern Analysis and Machine Intelligence 14(2):239-256 (1992).

Booth, *Modelling the impact of treatment uncertainties in radiotherapy*, University of Adelaide, Mar. 2002), Section 2.4 (http://thesis.library.adelaide.edu.au/uploads/approved/adt-SUA20020816.175301/public/03chapter2.pdf.

Brujic et al., *Analysis of Free-Form Surface Registration*, International Conference on Image Processing, pp. 393-396 (1996).

Cuisenaire, O., http://www.tele.ucl.ac.be/People/OC/these/node74.html, Posted Oct. 5, 1999, Downloaded from the Internet on Aug. 10, 2004.

Cuisenaire, O., http://www.tele.ucl.ac.be/PEOPLE/OC/these/node75.html, Posted Oct. 5, 1999, Downloaded from the Internet on Aug. 10, 2004.

Cuisenaire, O., http://www.tele.ucl.ac.be/PEOPLE/OC/these/node12.html, Posted Oct. 5, 1999, Downloaded from the Internet on Aug. 10, 2004.

Dubois et al. *Intraobserver and Interobserver Variability of MR Imaging- and CT-derived Prostate Volumes after Transperineal Interstitial Permanent Prostate Brachytherapy*, Radiology. 207(3):785-9 (1998).

Eggert et al., *Simultaneous Registration of Multiple Range Views for Reverse Engineering*, International Conference of Pattern Recognition, pp. 243-247 (1996).

Hanks, et al. , *Three Dimensional Conformal External Beam Treatment of Prostate Cancer* http://prostate-help.org/download/pilgrim/l0rad.pdf.

Hanks et al., *Clinical and Biochemical Evidence of Control of Prostate Cancer at 5 Years After External Beam Radiation*, The Journal of Urology, vol. 154, 456-459 (1995).

Haralick et al., *Pose Estimation From Corresponding Data Point*, IEEE Transactions on Systems, Man, and Cybernetics, 19(6):1426-1446 (1989).

Hua et al., *Development of a Semi-Automatic Alignment Tool for Accelerated Localization of the Prostate*, Int. J. Radiation Oncology Biol. Phys., 55(3):811-823 (2003).

Jiang et al., *A New Approach to 3-d Registration of Multimodality Medical Images by Surface Matching*, SPIE vol. 1808 Visualization in Biomedical Computing, pp. 196-213 (1992).

Krempien et al., *Daily patient set-up control in radiation therapy by coded light projection*, 3 pages.

Michalski et al., *Three-Dimensional Conformal Radiation Therapy (3DCRT) for Prostate Cancer*, Radiation Oncology Center, Mallinckrodt Institute of Radiology, Washington University Medical Center, St. Louis, Missouri (1996) http://www.phoenix5.org/Infolink/Michalski/#3.

Paskalev et al., *Daily Target Localization for Prostate Patients based on 3-D Image Correlation*, Phys. Med. Biol., vol. 49, pp. 931-939 (2004).

Pennec et al,. *A Framework for Uncertainty and Validation of 3-D Registration Methods Based on Points and Frames*, International Journal of Computer Vision 25(3), 203-229 (1997).

Pito, *A Registratin Aid*, International Conference on Recent Advanced in 3D Digital Imaging and Modelling, pp. 85-92 (1997).

Pollack et al., *Conventional vs. Conformal Radiotherapy for Prostate Cancer: Preliminary Results of Dosimetry and Acute Toxicity*, Int. J. Radiation Oncology Biol. Phys., 34(3):555-564.

Robb, *Three-Dimensional Visualization in Medicine and Biology*. Book Chapter in: Handbook of Medical Imaging: Processing and Analysis, ed. Isaac N. Bankman, Academic Press, San Diego, CA, Chapter 42, pp. 685-671 (2000).

Robinson, *Advances in Multi-Modal Data Analysis: The Analyze Software Environment*, http://www.ii.metu.edu.tr/~med-ii/makaleler/analyze_sw_enve.pdf, 5 pages Downloaded on Aug. 10, 2004.

Soffen E.M. et al. *Conformal static field radiation therapy treatment of early prostate cancer versus non-conformal techniques: A reduction in acute morbidity.* Int J Radiat Oncol Biol Phys, 24: 485-488 (1992).

Thayananthan, A. et al., http://mi.eng.cam.ac.uk/~bdrs2/papers/thayananthan_cvpr03.pdf, pp. 1-8. Downloaded from the Internet on Aug. 10, 2004.

Tome et al., *Commissioning and Quality Assurance of an Optically Guided Three-dimensional Ultrasound Target Localization System for Radiotherapy*, Med. Phys., 29(8):1781-1788 (2002).

(56) References Cited

OTHER PUBLICATIONS

Zhang, *Iterative Point Matching for Registration of Free-Form Curves and Surfaces*, International Journal of Computer Vision, 13(2):119-152 (1994).
http://www.ucsf.edu/jpouliot/Course/chapter5.htm.
http://www.acmp.org/meetings/hershey_2001/highlights/benedict.pdf.
http://www.ucsf.edu/jpouliot/Course/Lesson22.htm.
http://www.gemedicalsystems.com/patient/see_treat/positioning.html.
http://www.emoryradiationoncology.org/high-technology.htm.
http://www.varian.com/pinf/imr000c.html.
http://www.ucsf.edu/jpouliot/Course/conformal_radiation_therapy.htm.
Boctor, et al., *A Rapid Calibration Method for Registration and 3D Tracking of Ultrasound Images Using Spatial Localizer*, Proceedings of the SPIE (2003).
Claim Chart for Claim 10 of US Patent No. 5,447,154.
Van de Geijn, J. et al. *A Graticule for Evaluation of Megavolt X Ray Port Films*, Radiation Oncology Biology Physics, Nov. 1982, vol. 8, No. 11 pp. 1999-2000.
Bijhold, J. et al. *Fast evaluation of patient set-up during radiotherapy by aligning features in portal and simulator images*, Phys. Med. Biol., 1999, vol. 36, No. 12, pp. 1665-1679.
Meertens, H. et al. *A method for the measurement of field placement errors in digital portal images*, Phys Med. Biol., 1990, vol. 35, No. 3, pp. 299-323.
Aoki, Y. et al. *An Integrated Radiotherapy Treatment System and its Clinical Application*, Radiation Medicine, vol. 5, No. 4, pp. 131-141, 1987.
Troccaz, J. et al. *Conformal external radiotherapy of prostatic carcinoma: requirements and experimental results*, Radiotherapy and Oncology 29 (1993) pp. 176-183.
Le Verre, C. et al. *Intensity-Based Registration of Portal Images for Patient Positioning in Radiotherapy*.
Brunie L. et al. *Pre- and intra-irradiation multimodal image registration: principles and first experiments*, Radiotherapy and Oncology 29 (1993) pp. 244-252.
Troccaz., J et al. *Patient Setup Optimization for External Conformal Radiotherapy*, Journal of Image Guided Surgery, 1, pp. 113-120 (1995).
Simpson, R.G. et al. *A 4-MV CT scanner for radiation therapy: The prototype system*. Med. Phys. 9(4), Jul./Aug. 1982, pp. 574-579.
Swindell, W. et al. *Computed tomography with a linear accelerator with radiotheraphy applications*, Med. Phys. 10(4), Jul./Aug. 1983, pp. 416-420.
Reinstein, L. et al. *Radiotherapy Portal Imaging Quality. Report of AAPM Task Group No. 28*, American Association of Physicists in Medicine by the American Institute of Physics, New York, 1988.
Bijhold, J. *Three-dimensional verification of patient placement during radiotherapy using portal images*, Med. Phys. 20 (2), Pt. 1, Mar./Apr. 1993. pp. 347-356.
Boyer, A. A review of electronic portal imaging devices (EPIDs), Med. Phys. 19 (1), Jan./Feb. 1992 pp. 1-.
International Search Report for PCT/CA2005/001428 dated Nov. 16, 2005.
Written Opinion of the International Searching Authority dated Nov. 8, 2005.
Czamota G.J. et al. *Ultrasound imaging of apoptosis: high-resolution non-invasive monitoring of programmed cell death in vitro, in situ and in vivo*, British Journal of Cancer (1999) 81(3), pp. 520-527.
Caudra et al., "Atlas-based segmentation of pathological MR brain images using a model of lesion growth," Medical Imaging, IEEE Transactions on, vol. 23, No. 10, pp. 1301-1314, Oct. 2004.
Office Action issued by the Canadian Intellectual Property Office on Oct. 29, 2013 in Canadian Application No. 2,634,490.

* cited by examiner

METHODS AND SYSTEMS FOR SEGMENTATION AND SURFACE MATCHING

TECHNICAL FIELD

This invention relates to methods and systems for verifying anatomical features of a patient undergoing radiation therapy and, more particularly, to methods and systems for using reference images to identify surface elements of anatomical elements imaged at a later time.

BACKGROUND INFORMATION

Radiation-emitting devices are used for the treatment of cancerous tumors within patients. The primary goal of treating cancerous tumors with radiation therapy is the complete eradication of the cancerous cells, while the secondary goal is to avoid, to the maximum possible extent, damaging healthy tissue and organs in the vicinity of the tumor. Typically, a radiation therapy device includes a gantry that can be rotated around a horizontal axis of rotation during the delivery of a therapeutic treatment. A particle linear accelerator ("LINAC") is located within the gantry, and generates a high-energy radiation beam of therapy, such as an electron beam or photon (x-ray) beam. The patient is placed on a treatment table located at the isocenter of the gantry, and the radiation beam is directed toward the tumor or lesion to be treated.

Radiation therapy typically involves a planning stage and a treatment stage. Generally, the planning stage involves acquiring images of a lesion (using, for example an x-ray device) and subsequently using the image(s) to accurately measure the location, size, contour, and number of lesions to be treated. These are used to establish certain treatment plan parameters, such as an isocenter, beam angles, energy, aperture, dose distribution, and other parameters in an attempt to irradiate the lesion while minimizing damage to surrounding healthy tissue.

Imaging is often used by oncologists in determining the treatment parameters of radiation therapy plans such that the prescribed radiation is sufficient to eliminate the cancerous cells and while conforming the shape of the dose distribution to a target volume to the greatest extent possible, thereby sparing healthy tissue from exposure to potentially harmful doses of radiation. To develop a preferred treatment plan, simulations can be performed to design a set of beams which accomplish this goal that calculate the dose at each point in the patient resulting from this set of beams. The dose distribution can be represented, for example, as isodose lines or as three-dimensional isodose surfaces within the patient. The treatment goal is to encompass the lesion and an appropriate safety margin within the 100% isodose surface. The treatment plan is then administered, usually at a later date and over a period of weeks, based on the treatment parameters. One shortcoming of this approach is that the time lapse between treatment planning and treatment delivery allows for changes to the patient's anatomy, thereby potentially rendering the treatment plan sub-optimal. Changes such as lesion movement, growth, organ shifting, or other morphisms can cause healthy tissue to become subject to potentially harmful radiation, and cancerous tissue to extend beyond the boundaries of the original treatment plan.

Once a treatment plan is determined, the patient receives the radiation treatments during a number of sessions (fractions). Treatment often includes significant time lapses between individual fractions and can also span many weeks (e.g., once a day five days a week for four weeks.) Because organs can change location and/or shape from the time of planning to the delivery of the initial fraction, as well as from fraction to fraction, the original segmented, contoured image may no longer accurately represent the lesion being treated. As a result, the treatment plan may no longer be optimal. Three-dimensional imaging modalities that are able to discern soft-tissues are therefore used in the treatment room in order to detect and compensate for organ motion. However, because of the time constraints imposed during the individual fractions, and the lack of a trained physician during the fractions, it may not be possible to generate an updated segmented or contoured image of the lesion. Thus, methods that provide fast, accurate, and reliable images and patient positioning data without requiring a physician's expertise are of great benefit to a radiation technologist administering the radiation treatment.

Therefore, a fast technique to segment organs or structures of interest prior to a medical procedure with minimal user guidance is needed.

SUMMARY OF THE INVENTION

The present invention provides systems and methods to obtain a segmented, contoured, three-dimensional representation of an anatomical feature or structure of interest of a patient prior to a medical procedure with minimal user guidance, which uses the information provided by pre-operation contours approved by the physician as an initial estimate of the treatment contour shape. Such techniques facilitate determining patient positioning corrections to compensate for displacement and morphological change, modifying treatment parameters to account for the current location of the lesion, and/or calculating changes in lesion size and shape over the course of a medical treatment. The invention utilizes a surface model derived during the treatment planning phase and images taken during the treatment phase. In general, the invention relates to using a previously contoured image of a tissue volume acquired during the treatment planning phase as an initial estimate of the current surface.

In a typical embodiment, a user shifts, rotates and/or scales the planning contour (using, for example, a video screen) until the contour fits as close as possible to the lesion or organ in the treatment image, and then uses this shifted contour as an initial estimate for a local segmentation algorithm. The local segmentation algorithm, in turn, uses this estimate as a starting point to find edges in the current treatment image, resulting in a segmented, contoured surface of the lesion in the current image. The invention is based on an assumption that the volume in the current image to be segmented has translated, rotated and/or scaled from its position when initially imaged, and that the planning contour can serve as a reference surface for the local segmentation process. The surface is moved to the correct location in the current image (either manually and/or automatically) by using iterations of local segmentation and surface-matching techniques to gradually move the planning contour to the correct location in the treatment image, which can then used as an initial estimate for a final iteration of a local segmentation process.

In the radiotherapy application, for example, adjustments to the treatment parameters and/or patient positioning can be made based on the newly segmented volume image, and thus the invention facilitates rapid and accurate treatment position adjustment just prior to treatment delivery while including important clinical and/or practical concerns not addressed by other conventional methods.

In one aspect, a method for obtaining a contoured image of a lesion within a patient (for the purposes of administering radiation treatment, for example) includes providing a contoured reference image of the lesion based on images of the lesion taken at a first time (such as during a treatment planning session), generating a set of operational images at a second time (such as during a treatment delivery session), shifting (e.g., translating, rotating, scaling, or any combination thereof) the reference surface to an approximated location in the operational images, segmenting the operational images based on the shifted reference surface (using, for example, a local segmentation technique), and determining a contoured surface of the lesion at the second time based on the segmentation.

The reference surface and/or operational images can be created from images generated using any suitable tomographic or other imaging modality, e.g., a CT scanner, a three-dimensional ultrasound device, a PET scanner, or an MRI device. The approximated location can be determined manually, or by indicating one or more points on the operational images and using a surface mapping algorithm to map surface elements on the reference surface to the indicated points. The surface elements on the reference surface can include triangles or other two-dimensional shapes, lines or points, and the points on the operational images can represent edge boundaries. In some embodiments, two-dimensional cross-sectional cuts through the surfaces and/or images (either radially offset or parallel to each other) and can be used as input into a segmentation algorithm. The process of shifting the reference surface with surface matching and segmentation can be repeated iteratively using the shifted reference surface in place of the operational images. A minimization threshold (e.g., minimum squared distance) can be used to determine when the shifted image is optimally placed.

Weights can be assigned to the surface elements on the reference and/or treatment surface, and can be based on a degree of certainty that the surface element corresponds to a particular feature of the lesion, which in some cases can be an edge of the lesion; and/or on the clinical importance of an anatomical feature represented by the surface element and, in some embodiments, the proximity of an anatomical feature represented by the surface element to another anatomical structure of the patient. In some embodiments, the weights can be based on the density of the surface elements within a particular area of the image, and/or the area of the surface element itself.

In another aspect, a system for obtaining a contoured image of a lesion includes a register for storing a reference surface of the lesion based on images acquired at a first time, a second set of images of the lesion taken at a second time, and estimated surface elements on the second set of images. The system also includes a mapping module for mapping surface elements on the reference surface to estimated surface elements on the set of images and a processor for shifting (e.g., translating, rotating, and/or scaling) the reference surface based on the matched surface.

The foregoing and other objects, features and advantages of the present invention disclosed herein, as well as the invention itself, will be more fully understood from the following description of preferred embodiments and claims, when read together with the accompanying drawings.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Figure 1:
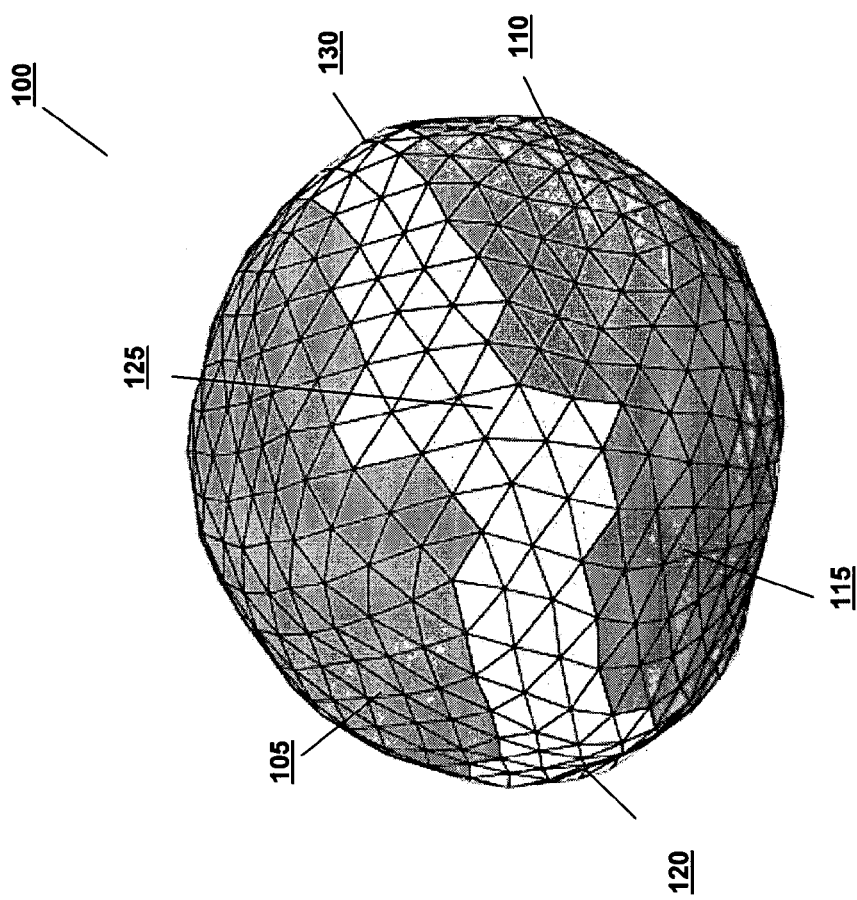
FIG. 1 schematically illustrates a segmented mapping of a lesion.

Referring to FIG. 1, an image 100 of a lesion is obtained during a treatment planning stage. The image can be an individual two-dimensional image, multiple two-dimensional sectional images or slices that collectively represent a volume and may be combined into a composite image, or three-dimensional images rendered programmatically or manually (or a combination). The image can be obtained using devices such as CT scanners, ultrasound devices, MRI devices, PET scanners, and x-ray devices, as well as other imaging modalities commonly used throughout the art. The structure of interest may be a tumor or lesion independent of other organs, a cancerous gland (such as the prostate) requiring treatment, a non-cancerous organ of interest, or any identifying landmark within the image. The image 100 may be, for instance, used by an oncologist, physician, or radiation technician to determine the location and shape of the lesion to be treated and to determine the parameters of the radiation treatment plan such as beam angle, beam shape, the number of beams needed to administer a sufficient dose to eradicate the target lesion, the dose level for each beams, and patient positioning. However, due to the changes mentioned above, elements in the image at treatment time are not always in the same location or in the same shape as they were during the planning stage. Furthermore, because the technicians that administer the treatment generally lack the training necessary to build a segmented and/or contoured image of the lesion, these changes are not easily incorporated into an updated treatment plan. Therefore, it would be beneficial to be able to use the original segmented image devised by the physician during the treatment planning stage during the treatment delivery phase, albeit adjusted for changes in position and shape. The time required to generate a new segmented, contoured image is also a constraint as there is limited time available to deliver the individual radiotherapy sessions.

During a treatment planning session, the organ or lesion surface is contoured into either manually, semi-automatically or automatically and a three-dimensional planning surface image (also referred to herein as a "reference surface") is generated. The reference surface can be described by points, line segments, a regular mesh, an analytic function, a set of triangles or other shapes, or any other surface representation. A second surface image (referred to as a "treatment surface" or "operative surface") is generated at treatment time. In either or both images, some points on the surface may be known with more confidence than others due to, for example, poor edge information in some locations. In such a case, each surface element can be assigned a weight that indicates how confident either the user or the segmentation algorithm is that the surface element corresponds to a true border. In the extreme case, a weight of zero indicates that a given surface element is completely arbitrary since there is no reliable image data in that region.

Still referring to FIG. 1, the image 100 of the lesion to be treated using radiation has been segmented into numerous triangular sections, each representing a different surface element. In some embodiments, certain surface elements can be weighted (e.g., elements 105, 110, and 115) so as to be given greater consideration by a surface-matching algorithm used to identify corresponding elements in a later image (described in greater detail below). Elements 120, 125, and 130 may also be considered during a matching process, but to discount any irregularities or compensate for unknowns in those areas, they can be given a weighting lower than those assigned to elements 105, 110, and 115. In some instances, the imaging modality used to obtain the images may not provide complete representations of the lesion. However, incomplete images can still be used as input into a matching algorithm by weighting surface elements in non-imaged areas with a low, or even zero weight and assigning a greater weight to elements in areas accurately characterized in the image. As a result, the algorithm will find elements of the lesion in the segmented image that correspond to those elements that are substantially discernible or of greater importance. In some cases, each surface element can be assigned an equal weighting, if, for example, weighting is not important for the particular application.

The weighting of the individual elements can be based on the degree of certainty of surface points or elements identified in the image—i.e., parts of a lesion's surface which are known with a greater degree of certainty are assigned higher weights than those about which there is less certainty. The degree of certainty can, for example, represent the accuracy with which the image or portion thereof accurately corresponds to an actual anatomical feature of the patient; the level of confidence that the representation is located accurately with respect to other anatomical features, the patient, fiducial markers, or other positioning devices; or the degree of detail shown (and accurately represented) in the image. The weighting of surface elements can also be determined using gradient information obtained by analyzing the pixels of the image to determine closeness to a binary edge. Other reasons for assigning higher weights to certain surface elements with respect to others may be their clinical importance, such as their proximity to other critical organs or other highly-susceptible non-target tissues. For example, the posterior part of the prostate surface is close to the rectum and thus can be assigned a higher weight than elements on the rest of the prostate surface to ensure the prostate/rectal interface is correctly repositioned.

In addition to determining the weights based on anatomical features of the patient, the number and arrangement of the surface elements themselves can help determine the assigned weights. For example, the weights can be adjusted for the density of points within a particular region to reduce bias in the case of an unequal distribution of surface elements. Likewise, surface areas with only a few defined elements may be assigned reduced weights to reduce the effect of statistical outliers, to eliminate statistical noise, or to minimize damage to areas that have not been adequately characterized by imaging.

Technicians generally rely on images such as ultrasound and/or CT to detect changes to the lesion between the planning stage and treatment stage (and in some cases between individual treatment sessions). As mentioned above, there may not be sufficient time and/or skill to fully contour the treatment image prior to delivering the radiation dose. The invention provides methods and systems by which these subsequent images can be used in conjunction with the original segmented reference image to produce a segmented image that has effectively been "error-corrected" for lesion shift, rotation and morphisms.

Figure 2B:
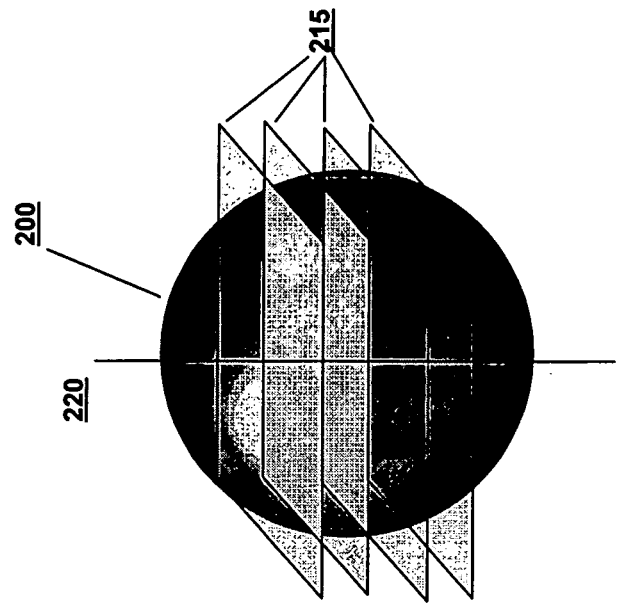
FIGS. 2a and 2b schematically illustrate obtaining cross-sectional views of the lesion.
Figure 2A:
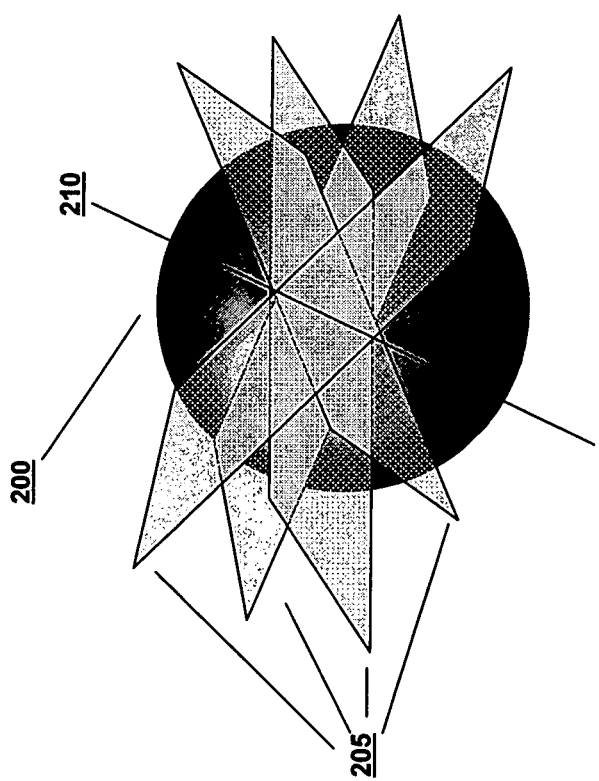

Referring to FIG. 2a, three-dimensional planning and/or treatment images 200 can be separated manually or programmatically into a series of two-dimensional cross-sectional image slices for easier manipulation. In one embodiment, images can be the original two-dimensional images taken prior to three-dimensional reconstruction. In another embodiment, the cross-sections 205 are radially offset from each other and taken about a common central axis 210 of the image 200. The degree of offset and number of images can vary according to individual images and lesions, although ten images offset at an angle of 5 degrees from each other provides sufficient imaging for a typical prostate gland. In another embodiment, and referring to FIG. 2b, the cross-sections 215 are parallel to each other and orthogonal to a common axis 220. In either case, the set of two-dimensional slices taken together represents the three-dimensional image dataset. Segmented structures can also be similarly divided into two-dimensional curves which are associated to each two-dimensional cross-sectional slice.

Figure 3B:
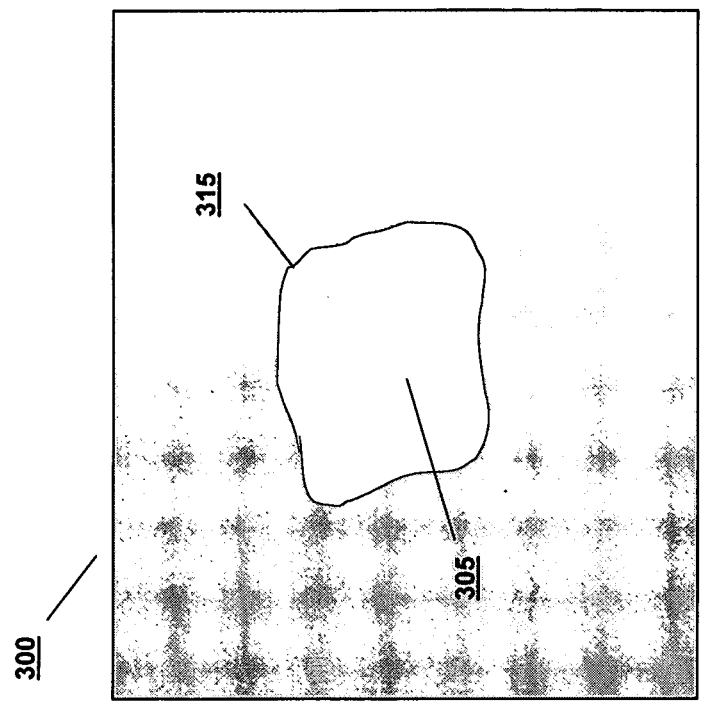
FIG. 3 schematically illustrates using a reference surface as an initial estimate for segmentation.
Figure 3A:
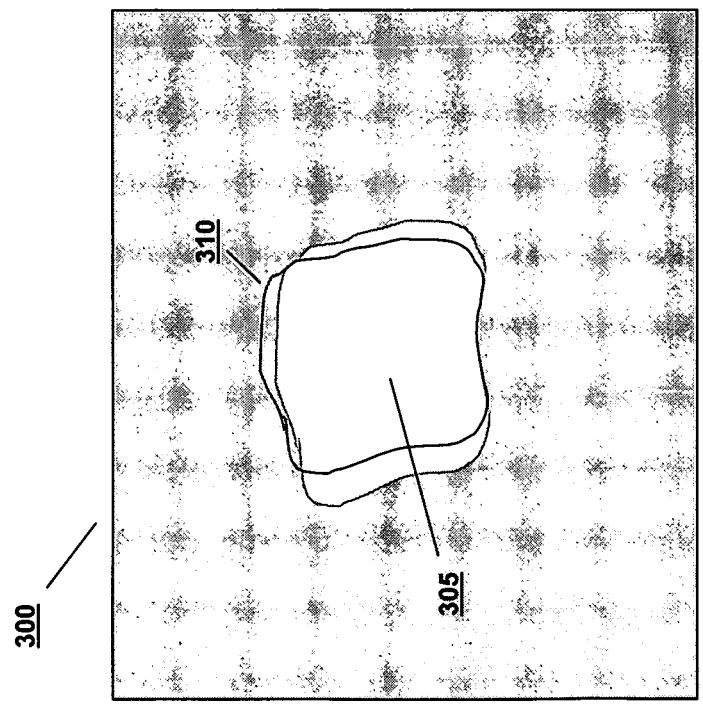

Referring to FIG. 3a, once the three-dimensional image is acquired and processed into a series of cross-sectional two-dimensional frames (300) the lesion or organ 305 is segmented in the treatment image. In one embodiment, the planning/reference segmentation 310 is superimposed on the treatment/operative image 300 and moved manually to the approximate location of the organ 305. Although only one frame 300 is shown, the user can also move the planning contour in at least one other orthogonal view plane until it is approximately at the correct position in three-dimensional space. If, as may be the case, the organ has changed only in position, then an exact match is possible and the surface can be segmented. If, however, there are morphisms such as changes in volume and/or shape, the shifted segmentation 310 serves as an "initial estimate" of the organ 305.

Referring to FIG. 3b, a local segmentation technique is used which starts from the initial estimate 310 to deform the contour such that it contours the organ 305 more accurately. Non-limiting examples of local segmentation techniques include those that use image gradients to attract contours to edges starting from an estimate of the contour, and techniques described in "Prostate boundary segmentation from 2D ultrasound images" by Ladak et al. in Med. Phys. 27 (8), p. 1777-1799 (2000) and "Prostate boundary segmentation from 3D ultrasound images" by Hu et al. in Med. Phys. 30 (7), p. 1648-1659 (2003). The invention facilitates the segmentation by using the planning surface, shifted to the correct location, as the initial estimate. The degree of morphism tolerated depends on the capabilities of the segmentation technique(s) used. In some cases, the initial planning surface can be scaled as well as shifted so that it represents the lesion in the treatment image more accurately. Instead of or in addition to scaling and shifting, the initial segmentation can be rotated if the lesion has rotated between planning and treatment times.

The local segmentation algorithm used can either be fully three-dimensional, or can be two-dimensional and applied separately on each cross-sectional plane 205 or 215. In the latter case, the set of two-dimensional curves generated by the segmentation algorithm can be reconstructed into a three-dimensional mesh.

Figure 4:
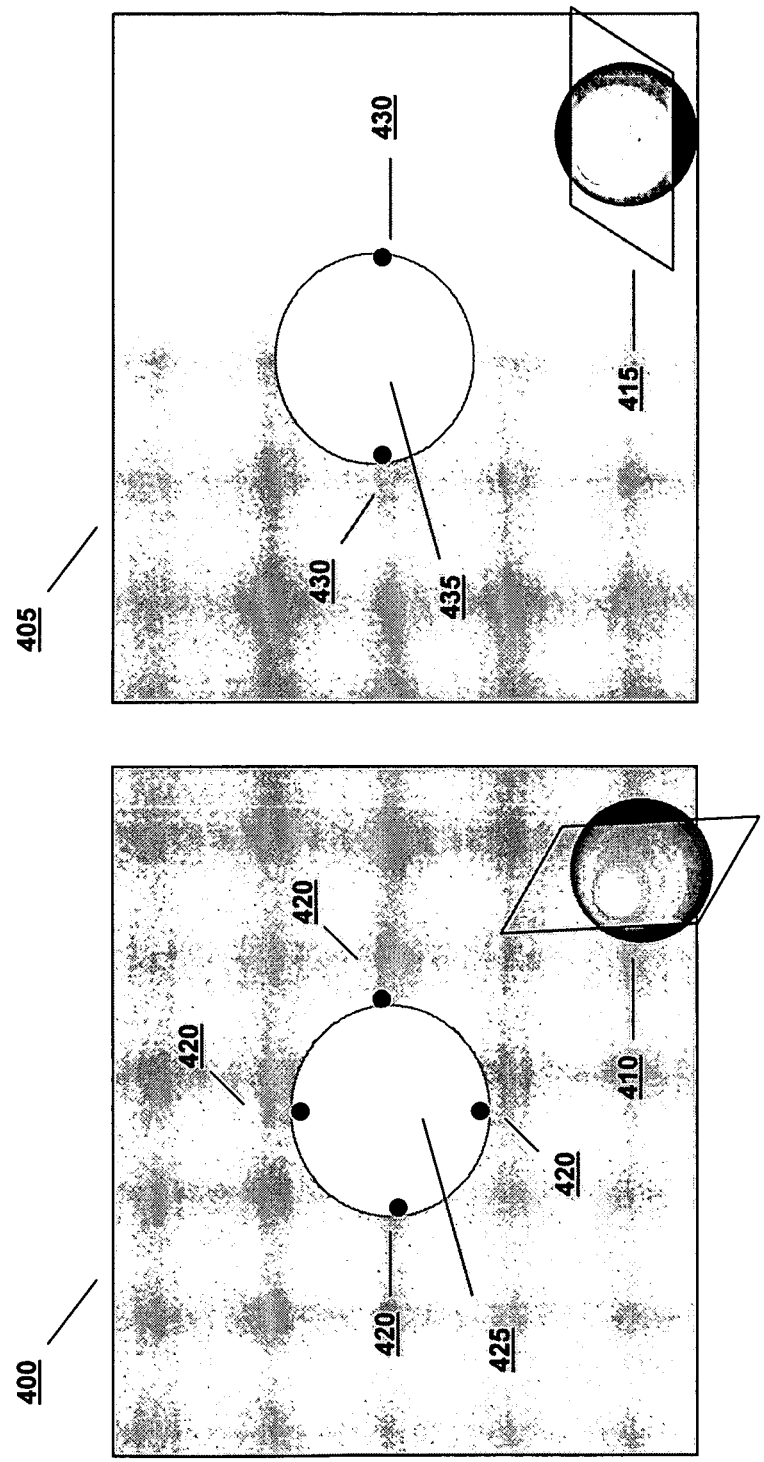
FIG. 4 schematically illustrates placing estimated surface elements on cross-sections of the lesion in accordance with one embodiment of the invention.

In another embodiment, the step of moving the planning contour manually is replaced by an automated process. Once the three-dimensional treatment image is acquired, the user defines a number of points on the surface of the organ to be segmented. The number of points should be minimal to conserve time, but should be sufficient to constrain the segmentation process in all three dimensions. For instance, referring to FIG. 4, two cross-sectional cuts 400 and 405 through the organ can be presented to the user. The orientation of the cuts are shown by 410 and 415. The user places four points 420 around the cross-section of the organ 425 in the first cut, and two points 430 in around the cross-section of the organ 435 in the second cut.

Figure 5A:
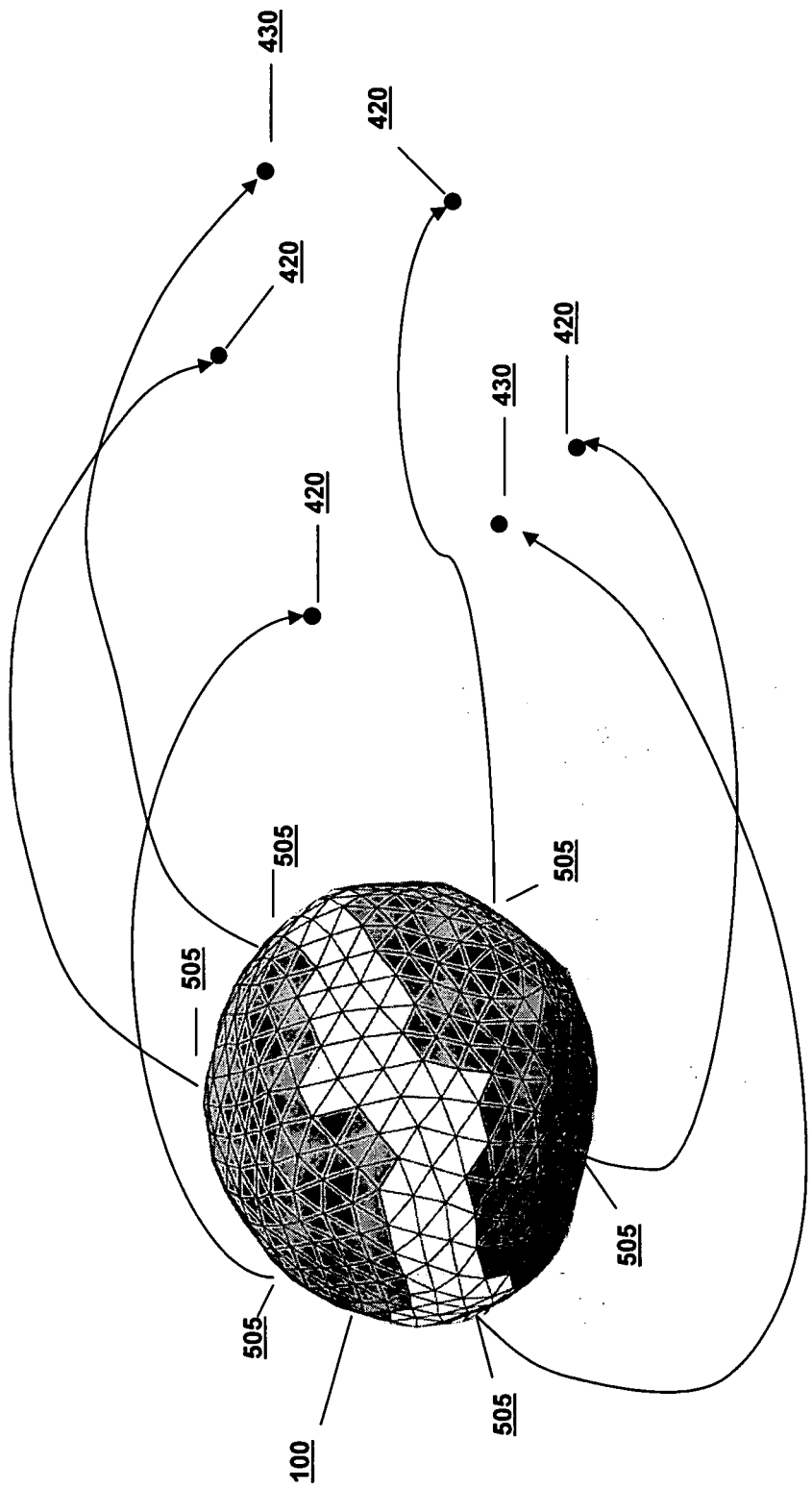
FIG. 5a schematically illustrates mapping surface elements of the segmented image to the estimated surface elements of FIG. 4.
Figure 5B:
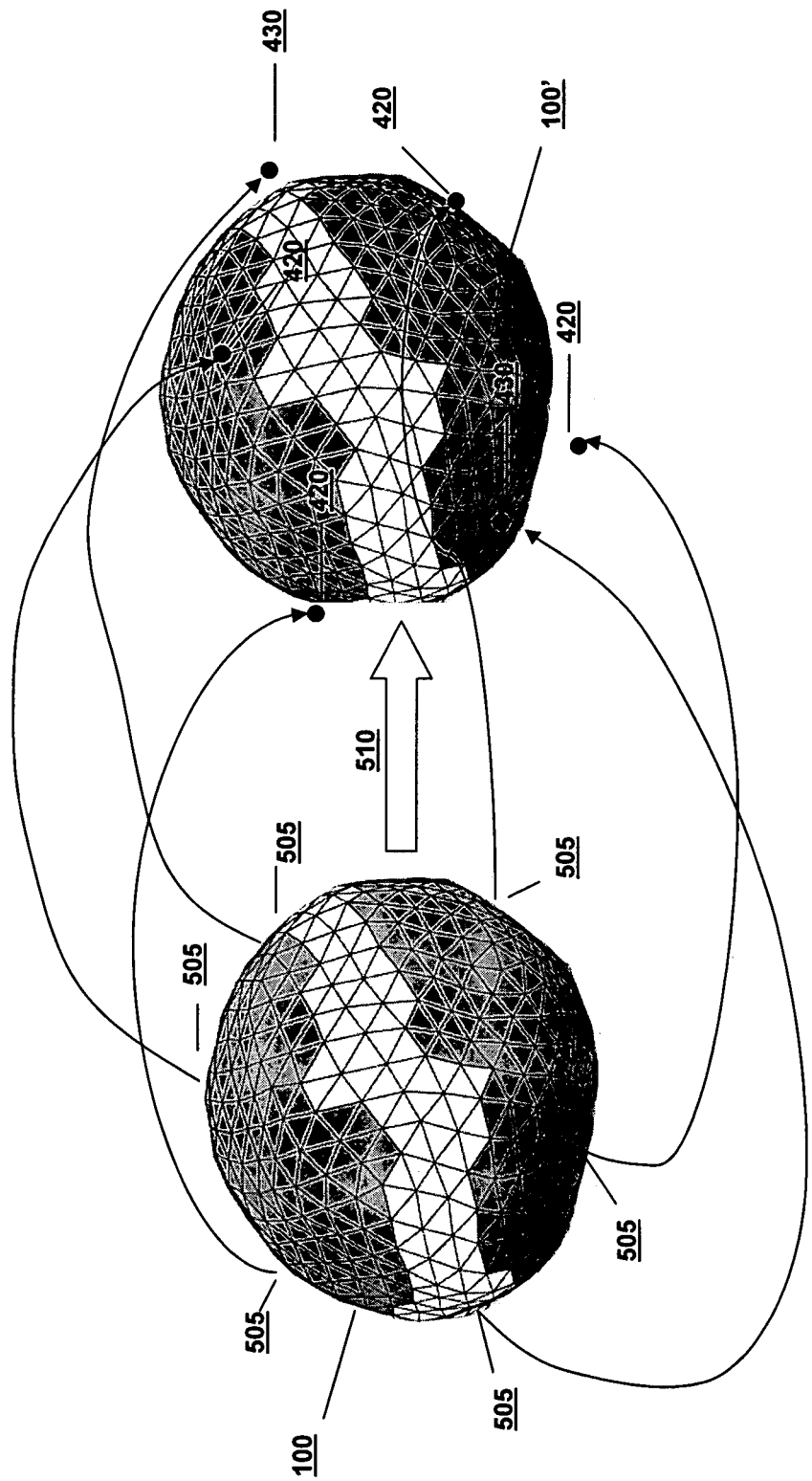
FIG. 5b schematically illustrates shifting the segmented image in accordance with the mapped surface elements of the segmented image and the cross-sectional view of the lesion.

Referring to FIGS. 5a and 5b, the set of elements 505 from the reference surface can be mapped to corresponding elements 420 and 430 identified on the treatment image, and the "shift" 510 necessary to move the surface image such that the corresponding elements 505 and the points 420 and 430 are aligned is measured. The process of detecting and measuring the shift can use any point-to-surface matching technique which, for example, minimizes the square distance between the points 420 and 430 and the surface, including, but not limited to the weighted surface-to-surface mapping technique described in currently-pending, co-owned U.S. patent application Ser. No. 10/894,392, the entire disclosure of which is incorporated by reference herein. The shift 510 can be applied to the surface image so that it is "close" to the organ of interest in the treatment image. This shifted surface 100' can then be used as an initial estimate to a local segmentation algorithm, as previously described, to find the contour of the lesion or organ at time of treatment.

Figure 6:
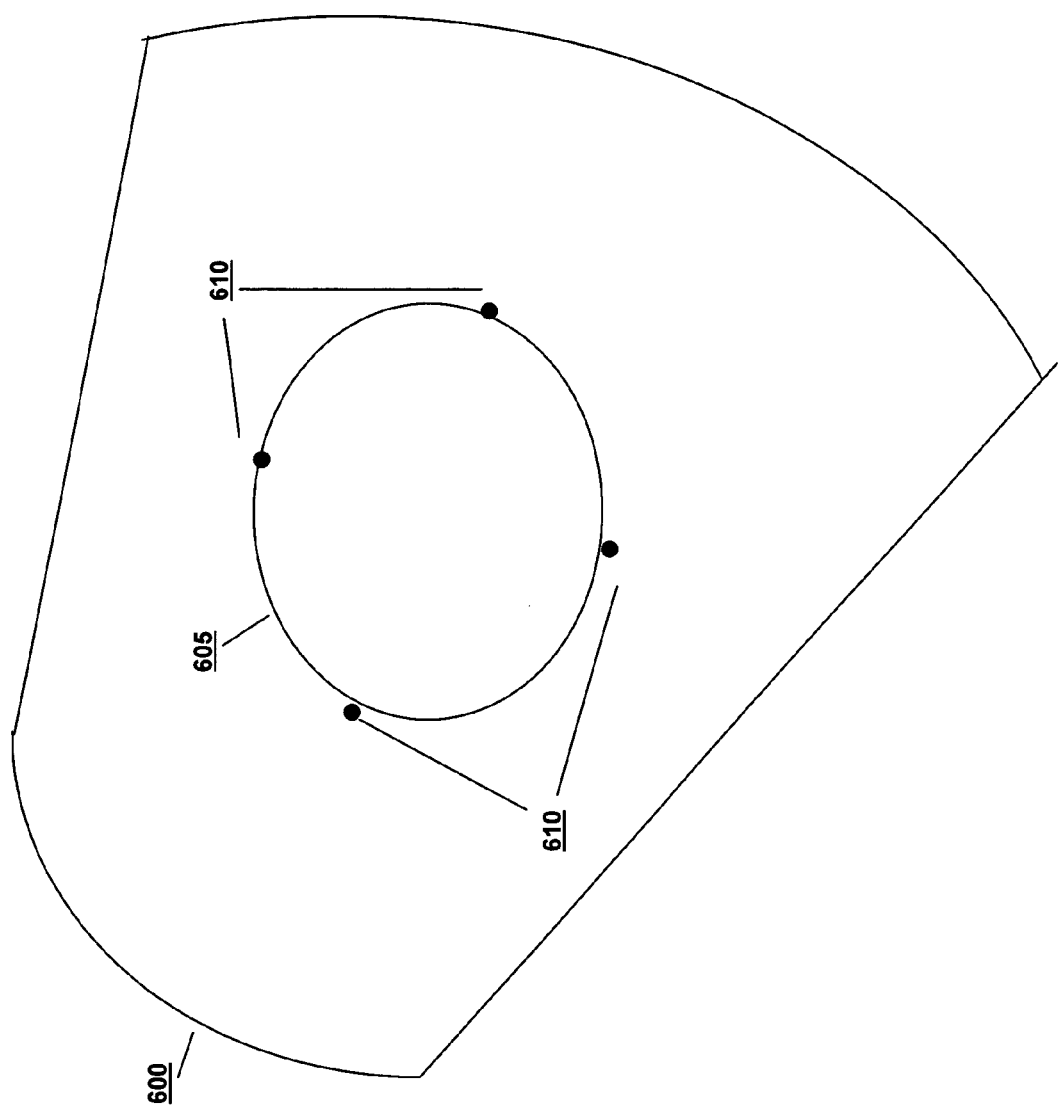
FIG. 6 schematically illustrates placing estimated surface elements on a cross-section of the lesion in accordance with one embodiment of the invention.

In some embodiments, such as a clinical setting where only one image may be presented to the technologist administering the treatment, the user need only select elements in a single cut through the three-dimensional treatment image. Referring to FIG. 6, the cross-sectional slice 600 shows an image of the lesion 605 and four user "hint-points" 610 can be indicated by the user on the lesion surface. If the hint points placed by the user in one plane are not sufficient to shift the planning surface to the correct location in the treatment image as previously described (because, for example, there are no points to constrain the shift in the direction perpendicular to the imaging plane), additional estimate points can be automatically identified in other planes using, for example, local segmentation techniques. These techniques can, in some cases, identify a full three-dimensional representation of the organ. It is unlikely, however, that the resulting contoured representation of the lesion will be suitable because local segmentation techniques require a good initial estimate, which in general cannot be suitably constructed with hint points in only one plane. The new surface, or partial surface, or series of points, generated by the initial local segmentation technique can, however, be used in a conventional point-to-surface or surface-to-surface matching process to bring the planning surface to an approximately correct position in the treatment image. This shifted planning surface can then, as previously described, be used as an initial estimate for another pass of the local segmentation technique to find a better representation of the organ at time of treatment.

In some embodiments, once the lesion or organ is contoured as previously described, the elements of the surface can once again be used to move the planning surface to a more accurate location in the treatment image. This process of local segmentation, surface matching, and shifting the planning surface can be repeated for a number of iterations until the planning surface is finally at the "best" (i.e., error-minimized) location. Once this best location is determined, then a final run of the local segmentation algorithm can be used to identify the edges of the organ.

One non-limiting example of a segmentation technique used to position the reference surface uses landmarks of the lesion that represent strong and/or well-defined edges of the lesion (the base of a prostate gland, for example). The edge points can be identified during an initial run of the segmentation process as well as after the user has identified one or more hint points. These strong edges can be assigned higher weights than other points, and in one embodiment, any points not in this initial set can be assigned a weight of zero. Similarly, the rotations or cross-sections used to identify the two-dimensional slices on which the estimate points are identified can be limited to certain rotations (e.g., at 45-degree angles to each other) to avoid capturing false and/or weak points on the images.

In some cases, segments of the contour obtained at time of planning, the contour obtained at time of treatment, and/or any intermediary contours obtained during the iterative process of finding the final treatment surface can be assigned a certainty weight c indicating how certain it is that the segmented point corresponds to a true edge. In some embodiments, the certainty weight c is a real number, or in some cases limited to either 0 or 1 representing uncertain and certain boundaries, respectively. Other methods to generate certainty weights include, but are not limited to, using the magnitude of the gradient at the surface point, a closeness to another edge detection technique, or manual identification. The result of the segmentation is the generation of a surface of the lesion at the time of treatment planning, $S_1$. The surface can consist of, for example, points, lines, or other surface elements such as triangles (e.g., in a mesh). The second image, obtained at treatment time (using, for example a three-dimensional ultrasound imaging device), $S_2$, is not segmented, and instead a set (e.g., 4) of estimated edge points are identified manually for one or more cross-sections of the image. For ease of representation, surface elements are hereafter referred to as "points."

Exemplary Surface-Matching Technique

Various embodiments, such as the one described above, use a surface matching technique to move the planning surface to an approximately correct location in the treatment image. Thus, techniques which map surface elements in a surface $S_1$ to surface elements in a surface $S_2$ are used. (Surface elements can be points, triangles, line segments, etc.) Any such technique can be used, but an exemplary technique is as follows. The set of surface elements and certainty weights on the segmented surface $S_1$ are referred to as $\{r_j^{(1)}\}=\{x_j^{(1)}, y_j^{(1)}, z_j^{(1)}, c_j^{(1)}\}$ and the estimated surface points of the set of two-dimensional cross-sections $S_2$ as $\{r_i^{(2)}\}=\{x_i^{(2)}, y_i^{(2)}, z_i^{(2)}, c_i^{(2)}\}$. The index i runs from 1 to the number of points in $S_2$, and the index j runs from 1 to the number of points N in $S_1$. The terms x, y, z represent the three-dimensional positional coordinates of each point and c refers to the certainty index assigned to that point. Either set of points can be down-sampled to improve the speed of computation by removing excess points. The set of certainty indices of $S_2$ (or, in some cases, $S_1$ or both $S_1$ and $S_2$) may be modified to account for the local density of elements in the case of surface points, or the area of the element in the case of a mesh, so that parts of surfaces with large density of elements are not overly weighted in the algorithm. As a result, the set of elements on $S_2$ are referred to as $\{r_i^{(2)}\}=\{x_i^{(2)}, y_i^{(2)}, z_i^{(2)}, c_i^{(2)}\}$ where $w_i^{(2)}$ is the modified set of certainty indices $c_i^{(2)}$.

The shift $r_{shift}$ which minimizes least-square error between points on $S_1$ and $S_2$ is found, which includes the weights of the points on each surface. A method to determine this shift is to minimize the cost function given by $$C(r_{shift}) = \sum_i W_i \cdot \|r_i^{(2)} - r_{close}^{(1)}(r_i^{(2)} - r_{shift}, S_1) - r_{shift}\|^2 \quad (1)$$

where $r_{close}^{(1)}(r_i^{(2)}-r_{shift}, S_1$ refers to the point on $S_1$ which is the closest to the point $r_i^{(2)}-r_{shift}$, and the weights $W_i$ are defined as $$W_i = w_i^{(2)} \cdot c_{close}^{(1)}(r_i^{(2)} - r_{shift}, S_1) \quad (2)$$

where $c_{close}^{(1)}(r_i^{(2)}-r_{shift}, S_1)$ refers to the certainty weight of that closest point on $S_1$. One suitable method of minimizing the cost of equation 1 includes the following steps:
1) Set $r_{shift}=(0,0,0)$
2) Calculate the set of closest points $r_{close}^{(1)}(r_i^{(2)}-r_{shift}, S_1$ in Eq. (1).
3) Calculate the cost $C(r_{shift})$ for this particular shift.
4) Is the cost below a threshold? If yes, stop and accept $r_{shift}$ as the optimal shift. If no, then update $r_{shift}$ to $r_{shift}+\Delta R$ where $\Delta R$ is an incremental update step.
5) return to step 2)

The shift vector $r_{shift}$ is updated by the update step $\Delta R$ until the cost function is a minimum. The result converges rapidly if $\Delta R$ is chosen such that:

$$\Delta R = \frac{1}{M}\sum_i W_i r_{close}^{(1)}(r_i^{(2)} - r_{shift}, S_1) - \frac{1}{N}\sum_i W_i r_i^{(2)}. \quad (3)$$

Rotations can also be introduced into the technique.

Figure 7:
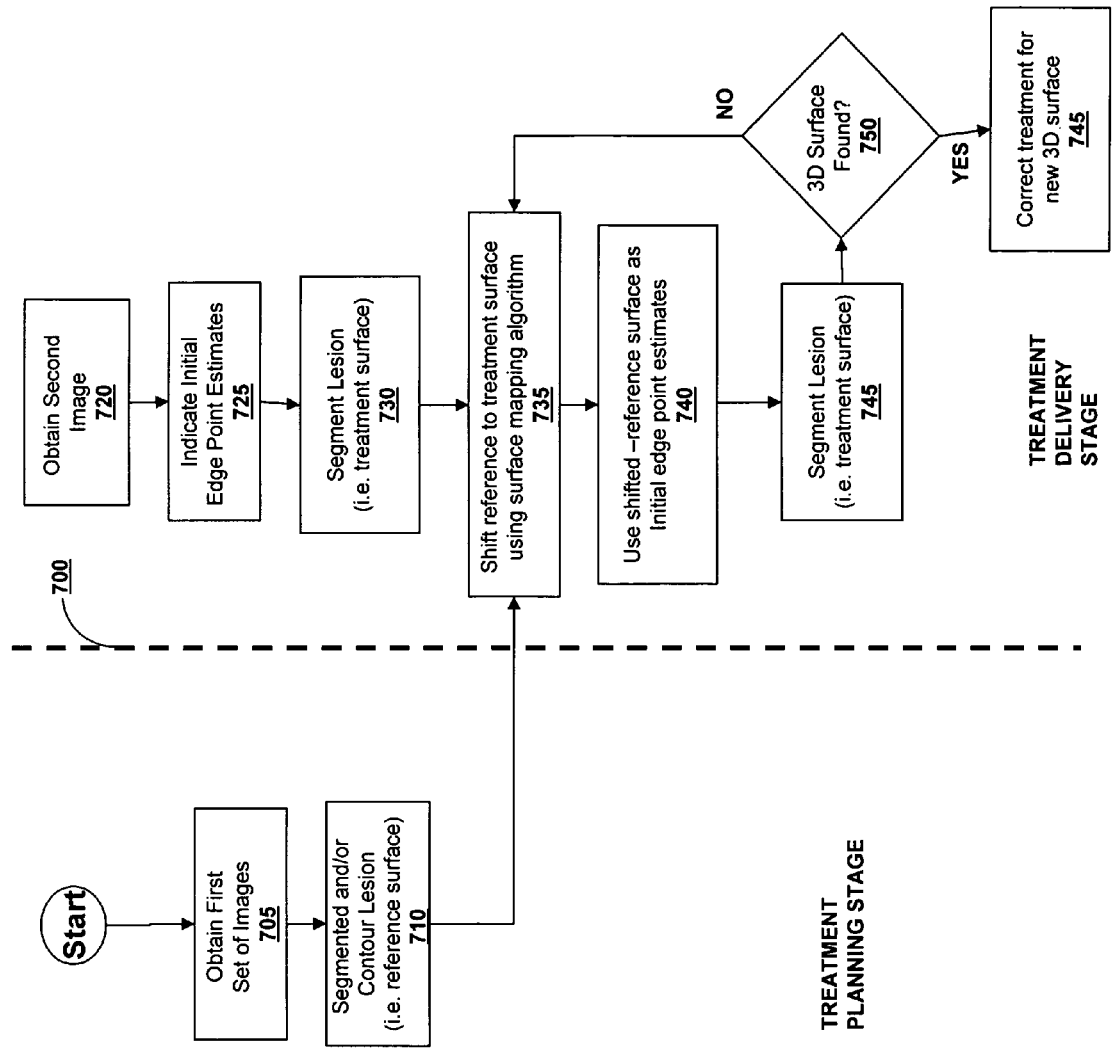
FIG. 7 is a flow diagram illustrating various embodiments of determining lesion displacement.

FIG. 7 illustrates various embodiments of a method of determining an appropriate adjustment to improve the delivery of radiation treatment to a patient. As described above, the process is typically divided into two phases: a treatment planning stage (corresponding to the steps to the left of the dashed line 700), during which an oncologist or similarly trained physician prepares a treatment plan for the administration of radiation to a cancerous lesion; and a treatment delivery stage (corresponding to the steps to the right of the dashed line 700) during which a radiology technician positions the patient within the gantry, makes any adjustments to the positioning based on lesion morphing or shifting, and administers the radiation according to the treatment plan. The treatment planning phase can occur substantially before the treatment delivery phase, or in some cases immediately preceding the treatment delivery phase, and may take place in the same room, or in some cases different rooms. As the time span increases between the phases, the target lesion has a greater opportunity to grow, change in morphology, and change its positioning with respect to surrounding normal tissue and healthy organs, resulting in a need for positional compensation.

As an initial step, a first image of the lesion and surrounding area is obtained (step 705) using any of the imaging modalities described above. In some instances, the image may not be a complete representation of the target lesion or surrounding organs, whereas in some instances the image can be a very accurate representation of the target area. From this first image, a segmented and/or contoured image consisting of a set of surface elements is generated (step 710) representing one or more surface elements of the lesion and surrounding organs. The set of surface elements (collectively the "reference surface") may include the entire three-dimensional surface, or in some cases where only a portion of the lesion has been accurately imaged, may only describe a portion of the lesion. In some embodiments, one or more of the surface elements is weighted based on one or in some cases a combination of the factors described above. In some embodiments, the reference surface can be contoured manually by a physician on a series of axial CT slices, and the parallel contours integrated together to form a surface. The physician may also use one or more registered and fused datasets to show additional information, such as MRI, PET or 3D ultrasound. Automatic segmentation techniques may also aid the physician in segmenting the organ or lesion of interest.

Subsequent to obtaining the treatment planning image, and in anticipation of a treatment delivery session, a second image of the target area is obtained (step 720), using, for example, a three-dimensional ultrasound imaging device. One or more two-dimensional image planes are obtained by viewing cross-sections of the three-dimensional ultrasound image at various angles or positions relative to a common axis. A user then indicates estimates of edge points within one or more of the two-dimensional images. Any number of edge points may be identified, but in general, using four points for each two-dimensional image provides sufficient data to initiate the matching process with the reference surface image. Based on the second image, initial estimates of edge points are identified (step 725) and an axis of rotation is created in the plane of the identified points. Therefore, an approximate initial estimate to the organ surface, or a subset of points on the organ surface, is generated using minimal user input (e.g., four hint points on only one plane). In some cases, where an automatic knowledge-based technique is used to makes assumptions about anatomical landmarks (e.g., bladder is anterior to the prostate which is itself anterior to the rectum), it is possible to dispense with hint points altogether. In some embodiments, multiple two-dimensional cross-sections can be obtained by rotating about the axis of rotation identified in the first image, thereby facilitating identification of additional edge points. The edge point estimates are used as input to a segmentation process which generates the surface or surface elements of the "treatment" surface (step 730). The initial or reference surface can be shifted, rotated and/or warped (step 735) such that the mapped reference and treatment surface elements are then aligned.

In some cases, and at least for one iteration, the shifted reference surface can be used as an estimate in subsequent iterations for segmentation (step 740). An error can then be computed using, for example, a least-squares fit or other similar convergence calculation approach that measures the misalignment of the reference surface with the new treatment surface (step 745) estimates. If the three-dimensional surface is properly placed (e.g., a convergence decision threshold is met in step 750) the process ends, whereas if the error is unacceptable, the process repeats. The number of iterations can be predefined at a fixed value, which is known to converge for typical clinical images, or can be defined, for example, by comparing the amount by which the reference surface is shifted between each iteration and terminating the process when the shift falls below a given threshold.

Although the invention is described as relating to a single surface at time of planning and at time of treatment, it may also relate to multiple lesions and/or organs, some of which are to be treated and some of which are to be avoided.

In step 745, after the three-dimensional treatment surface is found, the plan may be updated to account for the change in location, shape, and rotation of the lesion. For example, a completely new plan can be developed, involving changing the beam angles, collimator angles, couch position, dose weights, etc. using inverse planning algorithms. In some embodiments, the shift can then be translated into a set of displacements for a patient support device, such as a treatment table of the LINAC, or the patient, just prior to or during treatment delivery. For example, a shift of (−4, +8) may translate into moving the treatment table 4 millimeters to the left and 8 millimeters up with respect to the gantry and radiation beam. The shift can be calculated by finding the centroid of the current and reference surfaces and shifting the treatment couch by that amount and/or by implementing a final surface-matching algorithm, with or without associated weights as described above, to calculate a couch displacement. Other shifts may require rotating the gantry, moving the patient, or some combination thereof.

Alternatively, a technician may use simulation techniques to directly manipulate the patient or patent support device while viewing the real-time images of the target area on a screen or monitor. In one embodiment, a technician can adjust the treatment table position with respect to the LINAC until a desired number of surface elements from the second image overlaps corresponding elements in the first image (or vice versa), or a threshold value is reached indicating a sufficient overlap, by manipulating an input device such as a joystick, keypad, or other input device. In another embodiment, the technician manually adjusts the position of the patient on a stationary treatment table until the desired position is reached. In some cases, the technician may employ a combination of both programmatic adjustments based on pre-determined alignment displacements and manual patient positioning techniques.

Figure 8:
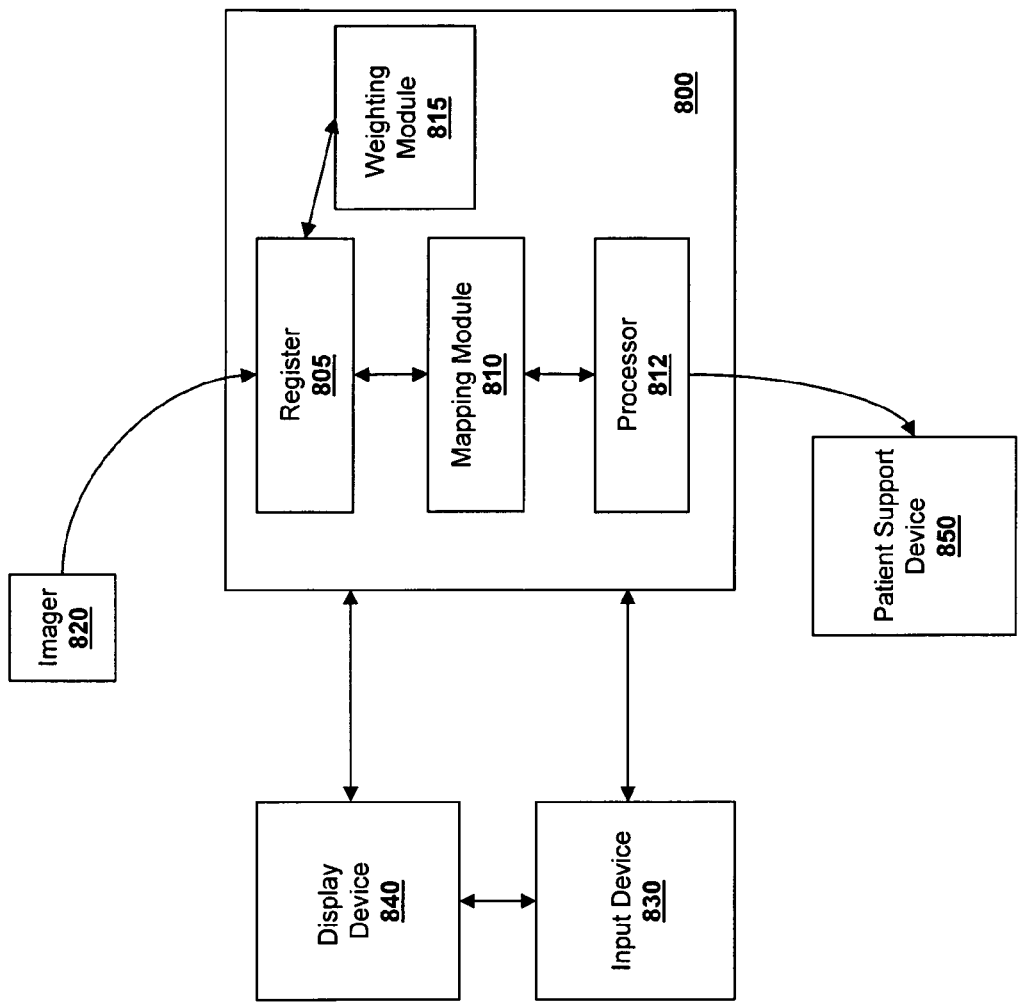
FIG. 8 is a schematic illustration of various embodiments of a system adapted to practice the methods of the present invention.

FIG. 8 schematically represents a hardware embodiment of the invention realized as a system 800 for determining the changes to a lesion in anticipation of the administration of radiation therapy. The system 800 comprises a register 805, a mapping module 810, and a processor 812 and may optionally include a weighting module 815.

The register 805, which may be any known organized data storage facility (e.g., partitions in RAM, etc.), receives images from an imager 820 such as an MRI, CT/PET scanner, ultrasound device, or x-ray device. The register 805 receives a first image from the imager 820 during or subsequent to a treatment planning session characterizing the target region at the time the treatment plan is determined. The register 805 receives a second image from the imager 820 during or just previous to a treatment delivery session characterizing the target region at the time of treatment. The imaging modalities used during the planning and the treatment stages can, in some embodiments, be different. In some embodiments, the images can be stored on a data storage device separate from the imager (e.g., a database, microfiche, etc.) and sent to the system 800. The register 805 may receive the images and beam shapes through conventional data ports and may also include circuitry for receiving analog image data and analog-to-digital conversion circuitry for digitizing the image data.

The register 805 then determines a set of surface elements from the first image either programmatically, or based on some input from the user. The register 805 optionally provides the image to the weighting module 812, which facilitates the assignment of weights to one or more surface elements generated from the first image. The surface elements and weights can be determined programmatically, manually, or both. Where manual input and manipulation is used, the system 800 receives instructions from a user via an input device 830 such as a keyboard, a mouse, or other pointing device. Results of the weighting, manipulations, and alignments can also be viewed using a display device 840 such as a computer display screen or hand-held device. The set of surface elements from the first image, their associated weights, and the second image are then sent to the processor 810 which, based on the proximity of the surface elements (and optionally the assigned weights) of the first image and estimated edge points identified on the second image, shifts the first image to compensate for the displacement of the lesion as described above. In some embodiments, the processor 815 translates displacements into instructions representing physical movements of a patient support device 850 and sends the instructions to the device 850 in order to adjust the position of the patient in accordance with the alignment calculations.

In some embodiments, the register 805, mapping module 810, weighting module 812 and processor 815 may implement the functionality of the present invention in hardware or software, or a combination of both on a general-purpose computer. In addition, such a program may set aside portions of a computer's random access memory to provide control logic that affects one or more of the image manipulation, mapping, alignment, and support device control. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software could be implemented in an assembly language directed to a microprocessor resident on a computer. For example, the software can be implemented in Intel 80x86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

The invention herein is primarily described in relation to external beam radiotherapy, but can be used in any application where a reference surface is generated at one time and a semi-automatic or fully-automatic surface is acquired on the same subject at a later time. For example, in brachytherapy applications a physician often contours a lesion to develop a preplan, deciding on how many radioactive seeds to purchase, etc. In the operating room, the lesion or organ will require a new segmentation to develop a new plan, accounting for the new location and/or shape of the organ. The systems and methods described herein can be used to segment the lesion in the operating room, using the reference surface contoured during the preplanning stage.

While the invention has been particularly shown and described with reference to specific embodiments, it should be understood by those skilled in the area that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of obtaining a contoured surface representation of a lesion within a patient, the method comprising:
   obtaining a first contour representing an outer surface of the lesion at a first time prior to treatment, the first contour having been obtained from one or more planning images of the lesion acquired at the first time, the first contour including a first set of surface elements;

obtaining a set of treatment images of the lesion, the treatment images having been acquired from the patient during a treatment session at a second time later than the first time, wherein the treatment images include a second set of surface elements corresponding to the lesion during the treatment session at the second time;

positioning the first contour from the planning images within the set of treatment images at a location corresponding to the lesion;

calculating a mapping between the first set of surface elements and the second set of surface elements;

adjusting the first set of surface elements based on the calculated mapping by using the first contour as an initial estimate;

obtaining, based on the adjusted first set of surface elements, a second contour of the lesion from the treatment images obtained during the treatment session, the second contour representing the outer surface of the lesion at the second time; and generating display data to present the second contour of the lesion on a display.

2. The method of claim 1, wherein the positioning comprises a rotational movement.

3. The method of claim 1, wherein the positioning comprises at least one of a translational movement, a scaling, and a movement in three dimensions.

4. The method of claim 1, wherein the first contour is created using at least one or more CT images, three-dimensional ultrasound images, two-dimensional ultrasound images, PET images, and MRI images.

5. The method of claim 1, further comprising receiving data representing user input from a user manually locating the first contour with respect to the treatment images.

6. The method of claim 1, wherein the first set of surface elements comprises at least one of a plurality of points, triangles, lines, shapes, other surface representations, or combinations thereof.

7. The method of claim 6, further comprising minimizing a distance between the first set of surface elements and the second set of surface elements.

8. The method of claim 7, wherein the second set of surface elements are in multiple planes.

9. The method of claim 7, wherein the second set of surface elements are within one two-dimensional plane.

10. The method of claim 9, further comprising obtaining additional surface elements from the first contour and repeating the steps of positioning, calculating, adjusting, and obtaining of claim 1.

11. The method of claim 7, wherein the mapping is determined by minimizing a mean square distance between the first set of surface elements in the first contour and the second set of surface elements in the treatment images.

12. The method of claim 6, wherein the first set of surface elements on the first contour represent an edge boundary on the planning images.

13. The method of claim 6, wherein weights are assigned to the first set of surface elements on the first contour and the weights are based at least in part on a proximity of an anatomical feature represented by the surface element to another anatomical structure of the patient on the planning images.

14. The method of claim 6, wherein weights are assigned to the second set of the surface elements and the weights are based at least in part on a density of the second set of surface elements within an area of the treatment images.

15. The method of claim 1, further comprising obtaining two-dimensional cross-sectional curves from the first contour positioned at a location corresponding to the lesion on the planning images.

16. The method of claim 15, wherein the two-dimensional cross-sectional curves are radially offset from each other.

17. The method of claim 15, wherein the two-dimensional cross-sectional curves are parallel to each other.

18. The method of claim 1, further comprising obtaining a contoured surface representation of one or more lesions within a patient.

19. A system for obtaining a contoured image of a lesion, the system comprising:

a register for storing:
(i) a first contour comprising a first set of surface elements representing an outer surface of the lesion at a first time prior to treatment, the first contour having been obtained from one or more planning images of the lesion acquired from a patient at the first time,
(ii) a set of treatment images of the lesion taken from the patient during a treatment at a second time later than the first time, and
(iii) a second set of surface elements for the lesion in at least one of the treatment images and corresponding to the lesion during the treatment at the second time;

a mapping module for calculating a mapping between the first set of surface elements of the first contour to the second set of surface elements on at least one of the treatment images; and a processor for:
shifting the first set of surface elements of the first contour from the planning images to the second set of surface elements on the treatment images based on the mapping from the mapping module, wherein the first contour is used as an initial estimate for the shifting; and
obtaining, based on the adjusted first set of surface elements, a second contour of the lesion from the treatment images, the second contour representing the outer surface of the lesion at the second time.

20. The system of claim 19, wherein the first set of surface elements on the first contour comprise at least one member selected from the group consisting of points, triangles, and lines.

21. The system of claim 19, wherein the second set of surface elements in at least one of the treatment images comprise at least one member selected from the group consisting of points, triangles, and lines.

22. The system of claim 19, wherein the register further stores two-dimensional cross-sectional curves obtained from the shifted surface elements.

23. The system of claim 22, wherein the two-dimensional cross-sectional curves are radially offset from each other.

24. The system of claim 22, wherein the two-dimensional cross-sectional curves are parallel to each other.

25. The system of claim 19, wherein the mapping module and the processor iteratively map the first set of surface elements on the first contour to the second set of surface elements.

26. The system of claim 19, further comprising a weighting module for assigning weights to the second set of surface elements.

27. The system of claim 26, wherein the weights corresponding to the second set of surface elements indicate to a user if the second set of surface elements corresponds to a border.

28. The system of claim 26, wherein the weights further compensate for irregularities on the first contour.

29. The system of claim 26, wherein the weighting module is further configured to determine a degree of certainty to which at least a portion of the first contour corresponds to an actual anatomical feature of the patient.

30. The system of claim 19, wherein the mapping is determined by minimizing a mean square distance between the first set of surface elements on the first contour in the planning images and the second set of surface elements in at least one of the treatment images.

31. The system of claim 19, wherein the second time is substantially proximate to a treatment session.

32. The system of claim 19, wherein the register stores a plurality of initial contours, wherein each initial contour corresponds to one or more lesions within a patient.

33. One or more non-transitory computer-readable storage media having computer-executable instructions stored thereon for determining the changes to a lesion for the purpose of administering radiation treatment to the lesion, the computer-executable instructions for:

obtaining a first contour representing an outer surface of the lesion at a first time, the first contour having been obtained from one or more planning images of the lesion acquired from a patient at the first time, the first contour including a first set of surface elements;

obtaining a set of treatment images of the lesion, the treatment images having been acquired from the patient during a treatment at a second time later than the first time, wherein the treatment images include a second set of surface elements corresponding to the lesion during the treatment session at the second time;

positioning the first contour from the planning images within the set of treatment images at a location corresponding to the lesion shown on the treatment images;

calculating a mapping between the first set of surface elements and the second set of surface elements;

adjusting the first set of surface elements based on the calculated mapping by using the first contour as an initial estimate;

obtaining, based on the adjusted first set of surface elements, a second contour of the lesion from the treatment images, the second contour representing the outer surface of the lesion at the second time; and generating display data to present the second contour of the lesion on a display.

* * * * *